US012682725B2

(12) United States Patent
Kasmir

(10) Patent No.: US 12,682,725 B2
(45) Date of Patent: Jul. 14, 2026

(54) POWER SHARING TECHNIQUE FOR AN ELECTRONIC CHIME

(71) Applicant: Alarm.com Incorporated, Tysons, VA (US)

(72) Inventor: Seton Paul Kasmir, San Diego, CA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 18/893,409

(22) Filed: Sep. 23, 2024

(65) Prior Publication Data

US 2025/0104541 A1 Mar. 27, 2025

Related U.S. Application Data

(60) Provisional application No. 63/539,815, filed on Sep. 21, 2023.

(51) Int. Cl.
*G08B 3/00* (2006.01)

(52) U.S. Cl.
CPC .................................... *G08B 3/00* (2013.01)

(58) Field of Classification Search
CPC ............ G08B 3/00; G08B 3/10; H04N 7/186; H02M 1/008; H02M 7/02; H02M 7/217; H02M 1/0032; H02M 7/06; H04M 11/025; Y02B 70/10
USPC ......... 340/392.1, 384.1, 286.11, 286.01, 540
See application file for complete search history.

(56) References Cited

U.S. PATENT DOCUMENTS

| | | | | |
|---|---|---|---|---|
| 10,607,458 | B1 | 3/2020 | Sampson et al. | |
| 10,609,344 | B1 * | 3/2020 | Tso | G05B 19/02 |
| 10,938,294 | B1 | 3/2021 | Chin | |
| 11,252,378 | B1 | 2/2022 | Skeoch | |
| 11,889,009 | B2 * | 1/2024 | Scalisi | H04N 7/188 |
| 2011/0090068 | A1 | 4/2011 | Langer et al. | |
| 2017/0132886 | A1 | 5/2017 | Wilson et al. | |
| 2017/0221319 | A1 * | 8/2017 | Chen | H01H 13/52 |
| 2018/0190083 | A1 * | 7/2018 | Wu | G08B 3/10 |

OTHER PUBLICATIONS

International Search Report and Written Opinion in International Appln. No. PCT/US2024/048005, mailed Dec. 4, 2024, 15 pages.

* cited by examiner

*Primary Examiner* — Anh V La
(74) *Attorney, Agent, or Firm* — Fish & Richardson P.C.

(57) ABSTRACT

Methods, systems, and apparatus, including computer programs encoded on a computer storage medium, are disclosed for implementing a power sequencing technique implemented using circuitry for powering a chime that outputs audio in response to a trigger event. An integrated circuit of a video doorbell receives a first power signal from a source and generates a half-wave pulse for a power sharing sequence of the circuit, based on the first power signal. The generated half-wave pulse is interrupted and the circuit generates a second power signal that causes the chime to initiate outputting the audio. The second power signal corresponds to the first power signal and is generated in response to interrupting the half-wave pulse. The circuit resumes generating the half-wave pulse to power the chime using the power sharing sequence after causing the chime to initiate outputting the audio using the second power signal.

20 Claims, 8 Drawing Sheets

POWER SHARING TECHNIQUE FOR AN ELECTRONIC CHIME

CROSS REFERENCE TO RELATED APPLICATION

This application claims the benefit of U.S. Provisional Application No. 63/539,815, filed on Sep. 21, 2023, which is incorporated herein by reference in its entirety.

FIELD

This specification relates to integrated circuitry for powering a video doorbell and chime installed at a property.

BACKGROUND

Doorbells and related monitoring devices are often used at various types of properties, such as a home or commercial business. These doorbells and related devices can be implemented in different ways when installed at a particular location of the property. Some doorbells include hardware circuitry that provide different types of monitoring and control functionality. The functionality afforded by these doorbells, and their respective hardware circuitry, can include wireless image, video, and audio signal transmissions, which can be leveraged to monitor persons or items at a property as well as to obtain visual information about the items and communicate with persons at property.

The video doorbell may be a modern Wi-Fi video doorbell that replaces the conventional and largely analog and/or mechanical doorbell buttons typically found on homes or properties. Consumers and service providers typically reuse the existing doorbell components and wiring to save installation time and cost. Installation uses the existing wiring, alternating-current (AC) transformer, and an indoor/outdoor chime. The existing wiring and transformer may not offer adequate energy profiles to meet the unique power requirements of modern video/Wi-Fi doorbells and electronic chimes. Additionally, electronic chimes often generate unwanted noise based on the power signal characteristics output by the transformer as well as existing circuitry and power demands of modern Wi-Fi video doorbells.

SUMMARY

This document describes techniques for a power signaling framework implemented using improved hardware circuitry of a video doorbell in signal communication with a chime installed at a property. The power signaling framework can be used with an existing batteryless power sharing sequence to concurrently power a video doorbell and corresponding chime with improved efficiency over prior approaches for powering a video doorbell and chime. The chime can be a mechanical or electronic chime that outputs audio (e.g., a chime ring) in response to a trigger event that is detected at the video doorbell, such as when a button on the video doorbell is pressed or when a sensor of the video doorbell detects that a person or item is on or approaching a property.

Electronic circuitry of the video doorbell is configured to concurrently power the video doorbell and the chime using a batteryless power sharing sequence. For example, the circuitry includes a switch and a controller that controls a timing of the switch to short one or more inputs to the video doorbell. The controller controls the switch to iteratively switch between a first path of the circuit that supplies power to the video doorbell and the second path of the circuit that supplies power to the chime. This iterative switching is used to concurrently power the video doorbell and the chime without relying on battery power at the video doorbell, for example, in response to the button on the video doorbell being pressed or a sensor detects activity at a property.

The power signaling framework is implemented using electronic circuits that are integrated as part of a video doorbell. The power signaling framework includes generating a first power signal by a source, receiving a first power signal from the source, or a combination of these. The source can be a transformer at a property or another related device that transfers electrical energy from one circuit to another. For example, the first power signal can be an alternating-current (A/C) power signal generated by the transformer. A half-wave pulse associated with the power sharing sequence is generated based on the first power signal. The half-wave pulse is used to initialize (or power-up) the chime such that the chime is operable to accept a ring power signal for initiating a chime ring at the property.

The electronic circuitry (e.g., an integrated circuit) of the video doorbell generates a second power signal based on the power signaling framework. The second power signal is the ring power signal that causes the chime to initiate outputting audio corresponding to the chime ring. In some examples, the ring power signal is an alternating-current (A/C) power signal corresponding to a full A/C waveform. In these examples, the first and second power signals can have power signal characteristics that are substantially consistent. The integrated electronic circuitry is configured to provide or route the ring power signal to the chime to initiate the chime ring at the property when a trigger event is detected by the video doorbell. The circuit provides the ring power signal in response to shorting or interrupting the half-wave pulse.

The power signaling framework is configured to resume generating the half-wave pulse to power the chime using the power sharing sequence after causing the chime to initiate outputting the chime ring (or audio) based on the ring power signal. More specifically, the power signaling framework is configured such that the electronic circuitry of the video doorbell generates and provides the ring power signal for only a threshold time period. The threshold time period can be defined by a value selected from a range that is, for example, ½ of one second (0.5 sec) to one second (1 sec). For example, the threshold time period can be approximately ¾ of one second (0.75 sec). In some implementations, the threshold time period is predetermined, whereas in some other implementations, the threshold time period is determined dynamically at the electronic circuitry based on parameters of the power signaling framework.

One aspect of the subject matter described in this specification can be embodied in a method implemented using a circuit for powering a chime that outputs audio in response to a trigger event. The method includes receiving, from a source, a first power signal at the circuit; generating, based on the first power signal, a half-wave pulse for a power sharing sequence of the circuit; interrupting the half-wave pulse that was generated based on the first power signal; and generating a second power signal that causes the chime to initiate outputting the audio. The second power signal corresponds to the first power signal and is generated in response to interrupting the half-wave pulse. The method includes resuming generating the half-wave pulse to power the chime using the power sharing sequence after causing the chime to initiate outputting the audio using the second power signal.

These and other implementations can each optionally include one or more of the following features. For example, in some implementations, the chime is in signal communication with a video doorbell; and the trigger event coincides with: i) detection, by the video doorbell, of an individual at a property or ii) a button on the video doorbell being pressed. In some implementations, generating the second power signal in response to interrupting the half-wave pulse includes: generating the second power signal for a first predetermined, threshold time period.

In some implementations, the method further includes generating a third power signal concurrent with generating the second power signal and in response to interrupting the half-wave pulse; and providing power to the video doorbell using the third power signal concurrent with causing the chime to initiate outputting the audio using the second power signal. Generating the third power signal concurrent with generating the second power signal includes generating the third power signal from at least one super capacitor installed at the circuit. The first predetermined, threshold time period can be approximately ¾ of one second. In some implementations, the first predetermined, threshold time period is a value selected from a range between ½ of one second to one second.

The second power signal and the first power signal can be full wave sinusoidal or square alternating current ("A/C") power signals. In some implementations, the second power signal includes a signal waveform that corresponds to, or is consistent with, a signal waveform of the first power signal. In some implementations, generating the half-wave pulse based on the first power signal includes: generating the half-wave pulse for a second predetermined, threshold time period. In some implementations, the second predetermined, threshold time period is approximately 0.5 seconds to 1.5 seconds.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes integrated circuits and associated features of an improved video doorbell that leverages special-purpose digital and analog circuitry to implement a power sequencing technique that efficiently powers electronic chimes as well as the video doorbell at a property. The power sequencing technique uses at least a controller (e.g., a microcontroller) and related hardware circuitry of the video doorbell to efficiently power, for example, electronic indoor or outdoor chimes. The power sequencing technique can be implemented, while also leveraging a related technique for sharing power between the chime and the video doorbell to reduce the doorbell's dependency on internal batteries to sustain operation while ringing a chime that outputs sounds at or inside the property.

A portion or section of the integrated circuit for the video doorbell installed at a property can be configured to mimic a power sequence that occurs at the property when a switch/button of the video doorbell is pressed. The switch can be a switch assembly that includes a physical button switch on the video doorbell and a transistor switch that that switches in response to the physical button being depressed or based on a signal that is generated when a sensor on the video doorbell detects activity at the property. The transistor switch is configured for coupling to a chime (e.g., an electronic chime) installed at the property.

The integrated circuit is configured to mimic a typical sequence for powering up (and/or supplying power to) the chime to cause the chime to play a tune, such as a chime ring, of any length less than a ring pulse length once (e.g., only once). The circuit includes control logic that can mimic the power sequence without the typical requirement of manually tuning a ring pulse length at a particular installation or property. The control logic can be integrated in a microcontroller that is powered on based on the ring signal pulse.

Figure 1:
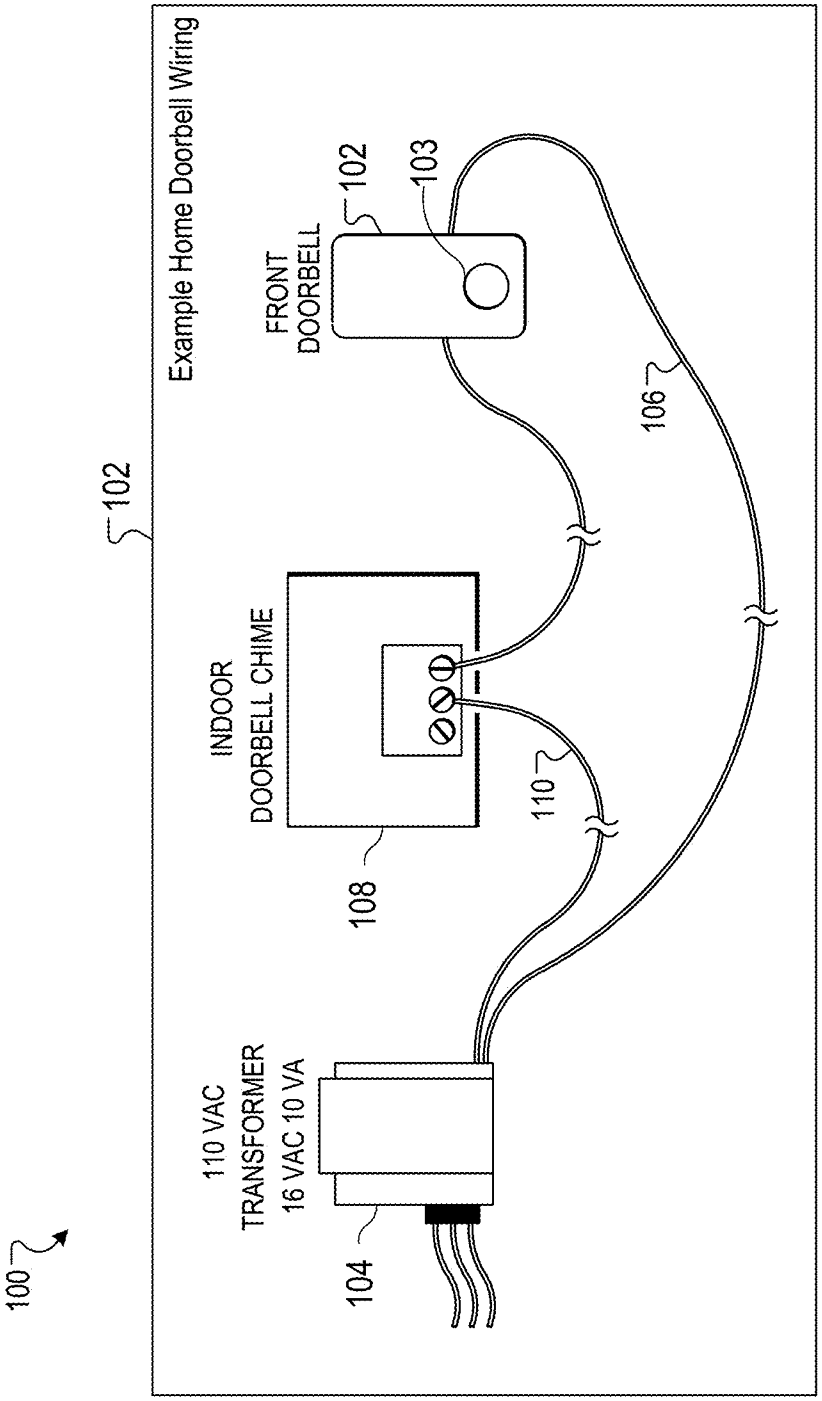
FIG. 1 illustrates an example doorbell wiring diagram.

FIG. 1 illustrates an example system 100 that includes an example home doorbell wiring diagram 101. As shown, system 100 can include a video doorbell 102, a transformer 104, and an indoor chime 108. The front doorbell 102 has a button 103 which is a mechanical switch that may be mounted on the outside of a property, such as a house (or other structure), and is connected to both a transformer 104 by a wire 106 and an indoor chime 108. In some cases, front doorbell button 103 is referred to alternatively as switch 103. The indoor chime 108 can be a mechanical chime or an electronic chime. The front doorbell button 103 is open until a person presses it. In other words, the front doorbell button 103 corresponds to a normally open switch of a circuit in the front doorbell, where the switch closes in response to the front doorbell button 103 being pressed or depressed by a user. Pressing the front doorbell button 103 closes the switch and completes a portion of the doorbell circuit so that power 110 supplied by the transformer 104 is applied to the indoor chime 108. This application of transformer power to the indoor chime 108 causes the familiar doorbell sound such as "ding dong."

Figure 2:
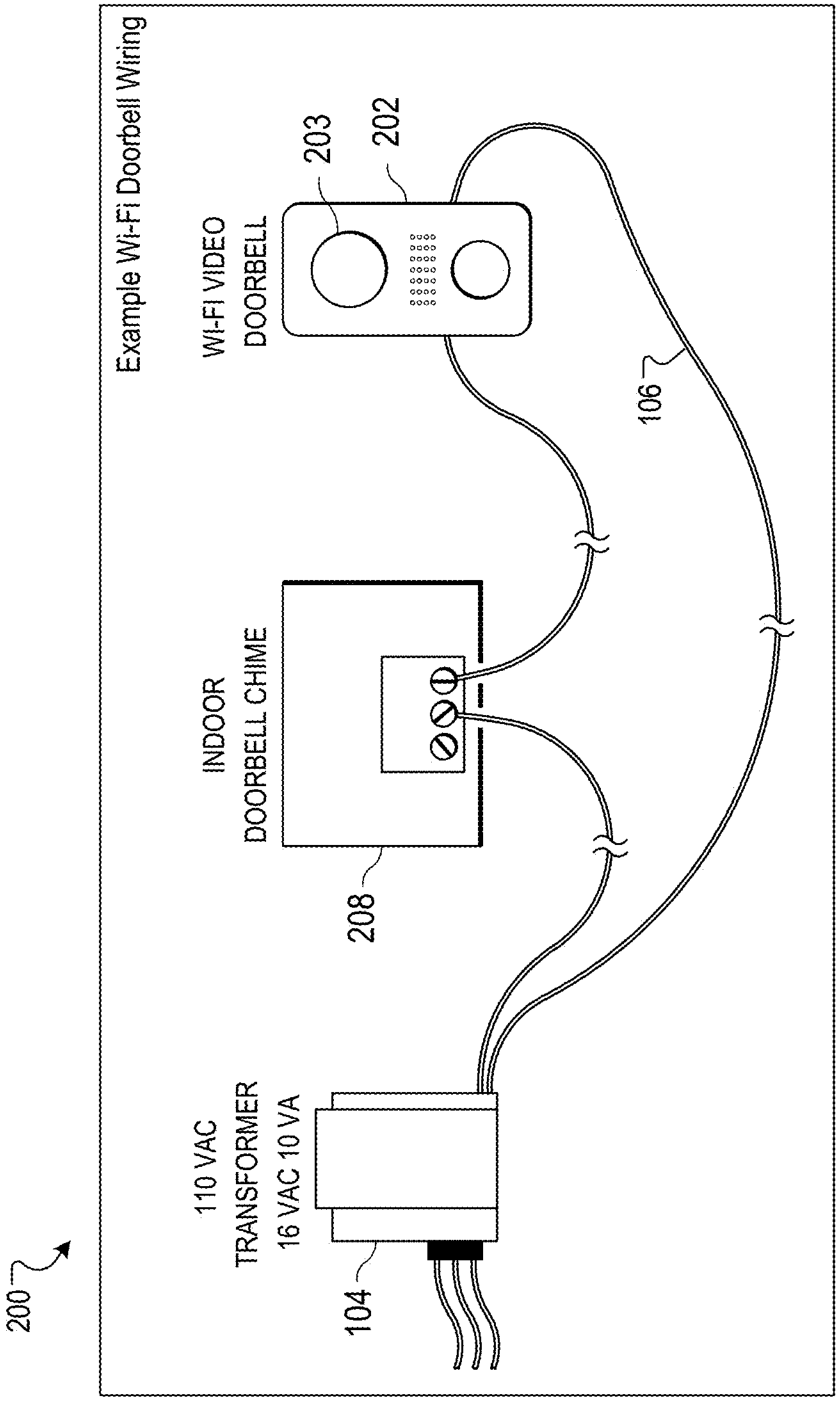
FIG. 2 illustrates an example doorbell wiring diagram where a video doorbell is powered using a transformer via two wired output connections.
Figure 3A:
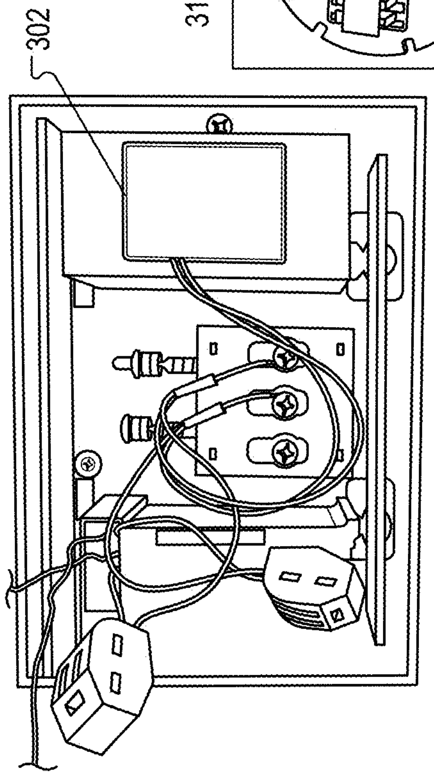
FIGS. 3A-3E illustrate example bypass circuits for a video doorbell.
Figure 3B:
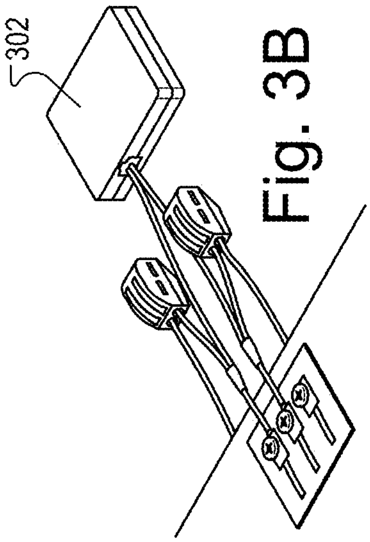
Figure 3C:
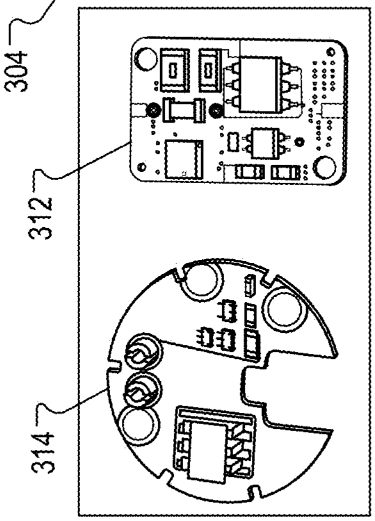
Figure 3D:
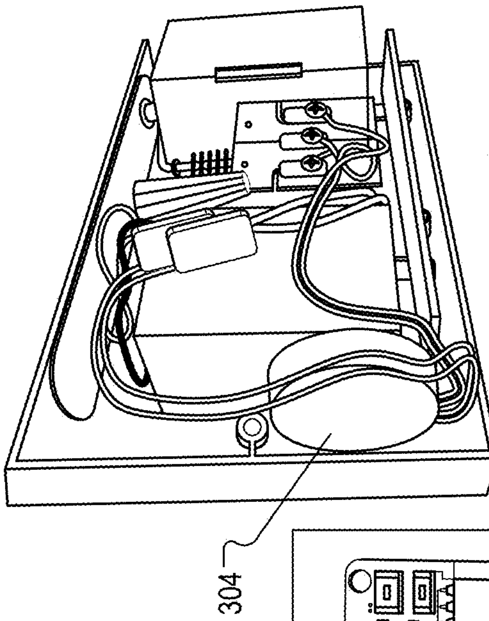
Figure 3E:
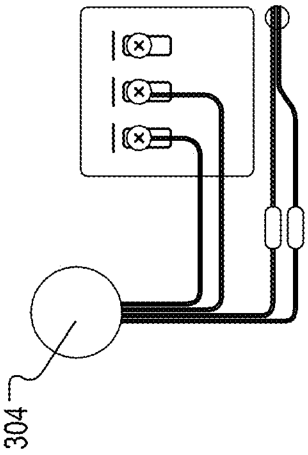

FIG. 2 illustrates an example home doorbell wiring diagram 200 where a video doorbell 202 (e.g., a Wi-Fi video doorbell) replaces the mechanical switch/button 103 of the front doorbell mounted on the property and is able to draw power from the transformer 104 via two wired output connections. In the example of FIG. 2, the transformer output connections travel through the wiring resistance of an electronic chime 208, and the other output is connected by a wire 106 directly to the transformer. The resistance of the mechanical chime may be, for example, six to eleven ohms.

The video doorbell 202 mimics the mechanical switch when its button is pressed by shorting the two external wires together, which applies all the power to the mechanical chime 108 making the ding dong sound. When the doorbell 202 is not ringing, the circuit is not open like the previous mechanical front doorbell, but instead, uses some amount of power that is lower than the amount of power to ring the indoor chime. The two states for voltage across the doorbell is normal operation where 90+percent of the voltage of the transformer is across the doorbell. In some implementations, out of 20.5 volts AC RMS from the transformer, it will be about 20 volts AC RMS. The other state is where electronically, the doorbell shorts its two input wires to simulate a button press. There may be little voltage across the doorbell. The normal operation includes powering on and booting up, going offline, configuring it via the application on the mobile phone, and active or inactive but alive. The impedance of the chime or chime bypass may be less than the video doorbell so under any state other than ringing, most of the voltage is across it.

FIG. 3 illustrates example bypass circuits for a video doorbell. Each of FIGS. 3A-3E illustrate examples of bypass circuits for a video doorbell. More specifically, each of FIG. 3A and FIG. 3B illustrate an example system that includes a device 302, which encloses an example bypass circuit 312 illustrated in FIG. 3C. Likewise, each of FIG. 3D and FIG. 3E illustrate an example system that includes a device 304, which encloses an example bypass circuit 314 illustrated in FIG. 3C. To complete the circuit when there is an electronic chime, a bypass circuit may be utilized. The bypass circuit can be used to power down the electronic chime and then wake up the chime with a signal that will ring it only when it needs to be used. In some implementations, a video doorbell utilizes the same bypass circuit for both electronic and mechanical chimes. In general, a bypass circuit is used to bypass a chime such that some, most, or all the power provided by the transformer 104 is supplied directly to the video doorbell, i.e., without traversing a signal path that passes through the chime.

As discussed above, in a home with a doorbell, there may be several elements that make up a system for announcing someone is at the door. The elements may include a low voltage AC transformer that converts the home power 110 VAC to 16 VAC, a chime for announcing that someone is at the door, a button next to a door such as the front door, and wiring that connects all of this together. Pressing the button may complete the circuit in a way that all the transformer power is applied to the chime. There are two types of chimes commonly found in a home, mechanical and electronic. An example electronic chime includes circuitry that causes the chime to output (or "play") audio, such as a tune, through a speaker. For example, the audio or tune can be a ding dong sound or the tune can be more elaborate tune such as the eight second Westminster chime.

The electronic chime may typically play a tune that is longer than a button press, often up to eight seconds. In some implementations, the electronic chime is constantly powered and must detect when the button is pressed and remains powered so that it may finish playing the tune after the button is pressed. There are several methods for doing this. One method uses a diode placed behind the button that constantly powers the chime. As soon as the button is pressed, the diode is shorted, which causes an output power signal associated with the transformer AC voltage to be applied to the chime. The chime plays its corresponding tune in response to detecting the output power signal.

Figure 4:
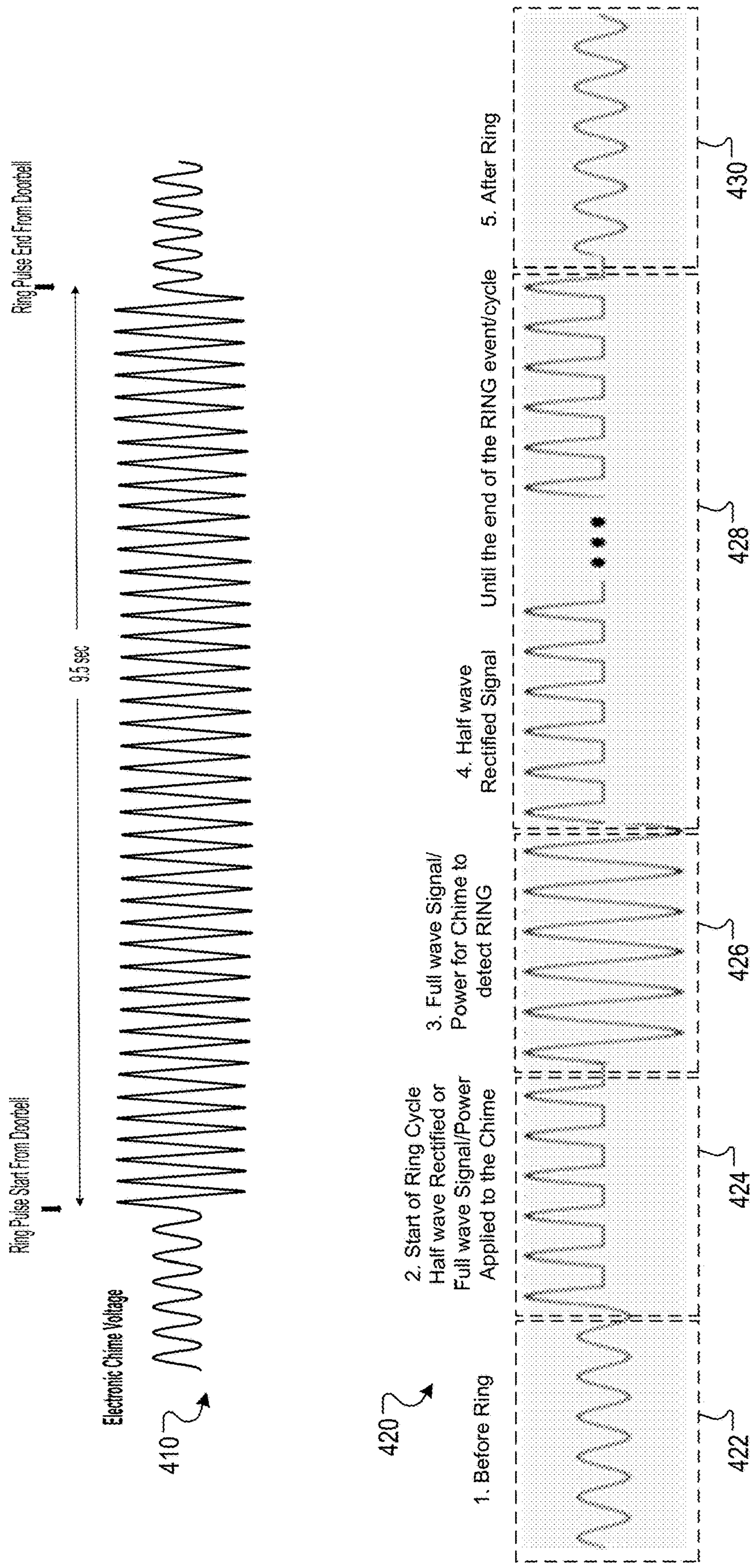
FIG. 4 illustrates an example timing diagram and example characteristics of voltage signals associated with a power sequencing technique.

FIG. 4 illustrates an example timing diagram 410 and 420, where each timing diagram indicates example characteristics of voltage signals that are associated with a power sequencing technique described in this document.

The timing diagram 410 shows a voltage signal that is generated and output from an example video doorbell for powering a chime to output a chime ring. As shown in the example of FIG. 4, for an electronic chime, the video doorbell can be configured to output a 9.5 second ring pulse, where the ring pulse can be an A/C type voltage (or power) signal that includes a ring pulse start and a ring pulse end. The timing diagram 420 includes a first segment 422, a second segment 424, a third segment 426, a fourth segment 428, and a fifth segment 430.

The first segment 422 includes a sample voltage that signal that is generated at a video doorbell before a ring is initiate at the chime, whereas the second segment 424 indicates a start of an example ring cycle where a half-wave rectified, or full wave voltage/power signal, is applied to the chime. The third segment 426 indicates an example full wave voltage/power signal that the video doorbell generates for a chime that is in signal communication (or coupled to) the video doorbell. For example, the chime can be an electronic chime and the video doorbell can generate the full wave voltage/power signal that is passed to the electronic chime to cause the electronic chime to detect a "RING" event.

The fourth segment 428 indicates an example half-wave rectified voltage/power signal that is applied to the chime for a duration of a ring cycle (e.g., until the end of the RING cycle). The fifth segment 430 includes an example voltage signal that corresponds to the voltage signal of the first segment 422 and is generated at the video doorbell after the ring is complete. In some implementations, the voltage/power signals of at least segments 424, 426, 428 are generated and applied for specific time durations based on the power sharing sequence and related techniques disclosed herein. This is described in more detail below with reference to the examples of FIG. 5 and FIG. 6.

An example operation sequence will now be described. In some implementations, a ringing cycle starts with the vide doorbell closing one of two switches. Optionally, the power/control signal to start/initiate the ring cycle can be a half-wave or full wave power/voltage signal. The full wave signal can power up a chime faster than the half wave signal, but the full wave signal can result little or no power going to the video doorbell. For example, this can occur when a full short is required across the input to the doorbell to generate full wave signal. Thus, when a full short occurs, the video doorbell is required to operate on internal power. In some implementations, the halfwave power signal is part of a power sharing sequence that allows power to be routed to both the chime, e.g., for powering up the chime, and to the video doorbell simultaneously. This can also allow the doorbell to operate on external power.

The chime is configured to start/initiate a chime tune/sound when the chime receives (or detects) an AC power waveform of sufficient length. For example, a sufficient length can be a time period from 300 millisecond (ms) to 750 ms depending on the chime. In some implementations, the system 100 is configured to support some (or all) chimes, or chime types, based on control logic of system 100 that can receive a chime identifier indicating an attribute of the chime. The control logic can then vary a length of the AC waveform based on the chime identifier or attribute.

In some implementations, during the example 300 ms to 750 ms pulse, the chime (or video doorbell) can use internal power, such as supercapacitor instead of a battery. This AC power waveform can be less than any tune stored inside an electronic chime which, in conjunction with the halfwave power signal, keeps the chime from starting a second chime irrespective of the time duration of segment 428. A circuit inside the video doorbell can be configured to fully short the doorbell's external wires to present a full wave AC power waveform to the chime. Circuitry inside the video doorbell can be also configured to fully short the doorbell's external wires to present a halfwave AC power waveform to the chime.

Figure 5:
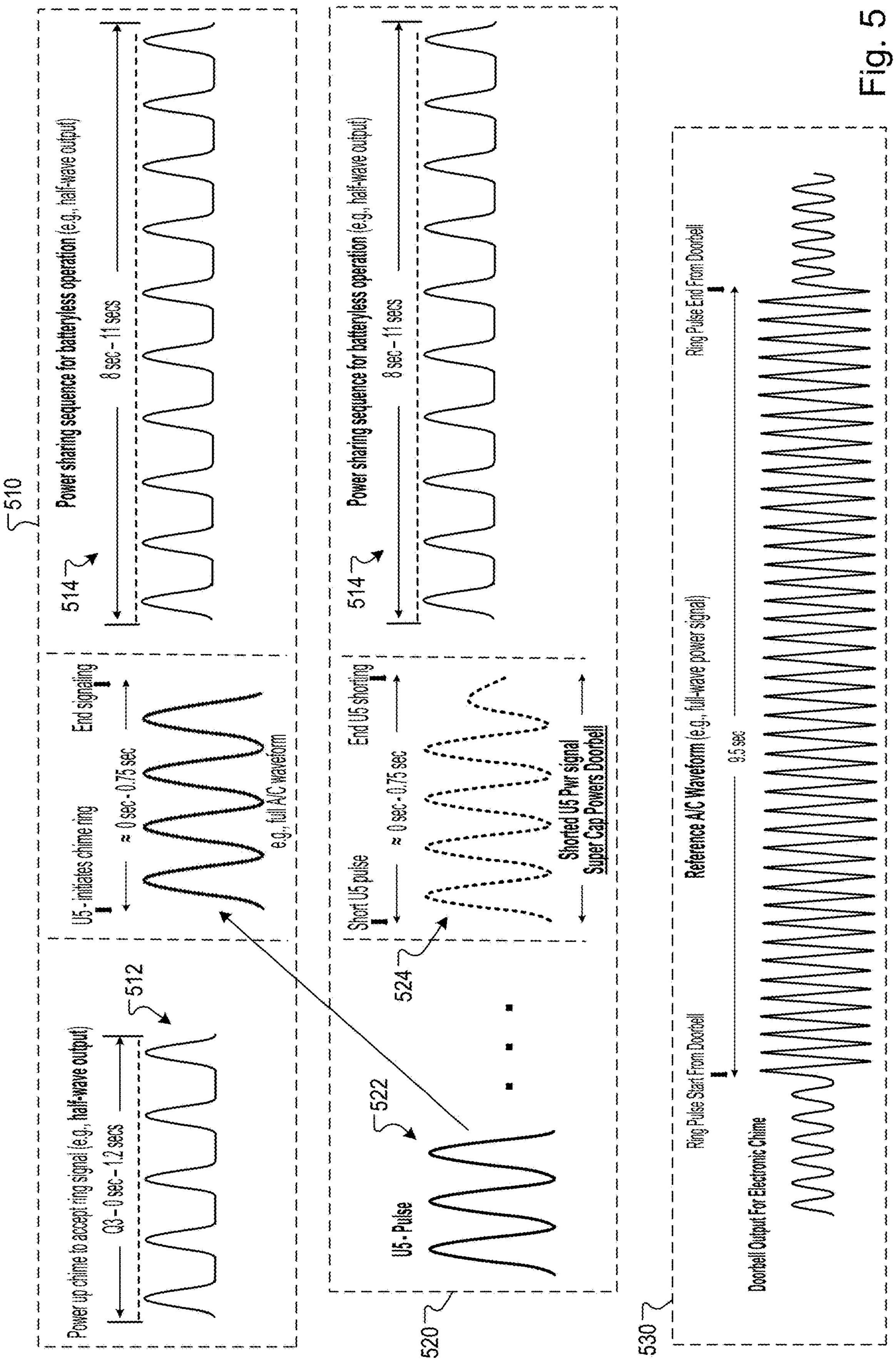
FIG. 5 illustrates example timing diagrams for signals associated with the power sequencing technique.

FIG. 5 illustrates example timing diagrams for signals associated with the disclosed power sequencing technique. The timing diagrams include a first timing block 510, a second timing block 520, and a third timing block 530. The first timing block 510 includes an example half-wave pulse 512 for powering up circuitry in an electronic chime such that the circuitry can accept a ring signal corresponding to a ring power signal 522 of the second timing block 520. The first timing block 510 also includes an example half-wave pulse 514 for a power sharing sequence that enables batteryless operation of the video doorbell 202, the electronic chime 208, or both. The second timing block 520 includes an indication of shorting or interrupting the ring power signal 522 for a predetermined, threshold time period.

During this predetermined, threshold time period, the video doorbell 202 can generate a power signal concurrent with generating the ring power signal and in response to interrupting the half-wave pulse 512. This power signal can be a capacitor-based power signal generated using one or more super capacitors installed at a circuit integrated in the video doorbell 202. The power sharing sequence provides power to the video doorbell using the power signal concurrent with causing the chime to initiate outputting the audio using the chime/ring power signal.

Figure 6:
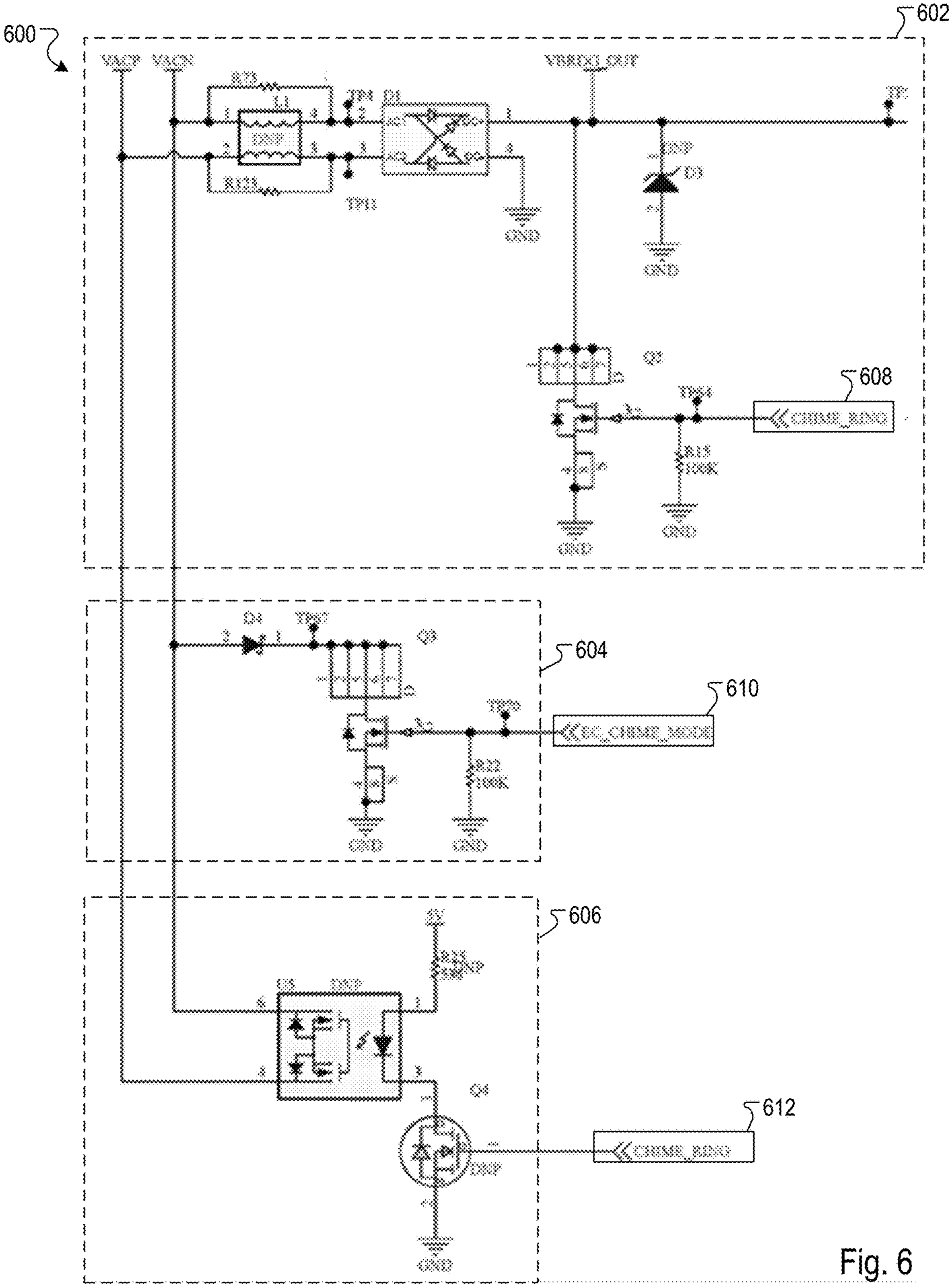
FIG. 6 illustrates an example circuit for implementing the power sequencing technique.

FIG. 6 illustrates an example circuit 600 for implementing the power sequencing technique. The circuit 600 includes circuit blocks that cooperate to generate one or more power signals. For example, circuit 600 includes a first circuit block 602 configured to generate a power signal 608 that rings an electronic chime, which causes the electronic chime to initiate outputting or playing audio. The power signal 208 generated at circuit block 602 can correspond to an AC power signal generated from a source such as transformer 204. In some implementations, power signal 208 is a full wave sinusoidal or square alternating current ("A/C") power signal.

Circuit 600 includes a second circuit block 604 configured to generate a power signal 610. For example, the power signal 610 can be a half-wave pulse. In some implementations, the power signal 610 is a half-wave rectified AC waveform signal. Circuit 600 includes a third circuit block 606 configured to generate a power signal 612. In some implementations, circuit block 606 is alternative option for generating a power signal that is the same as, or substantially similar to, the power signal 608. In some implementations, the circuit 600 may be included as part of the video doorbell 202. In some other implementations, the circuit 600 is a special-purpose circuit that includes multiple circuits or circuit portions, where some (or all) of the circuits may be separate from the video doorbell 202, included as part of the video doorbell 202, or included with the electronic chime 208.

Figure 7:
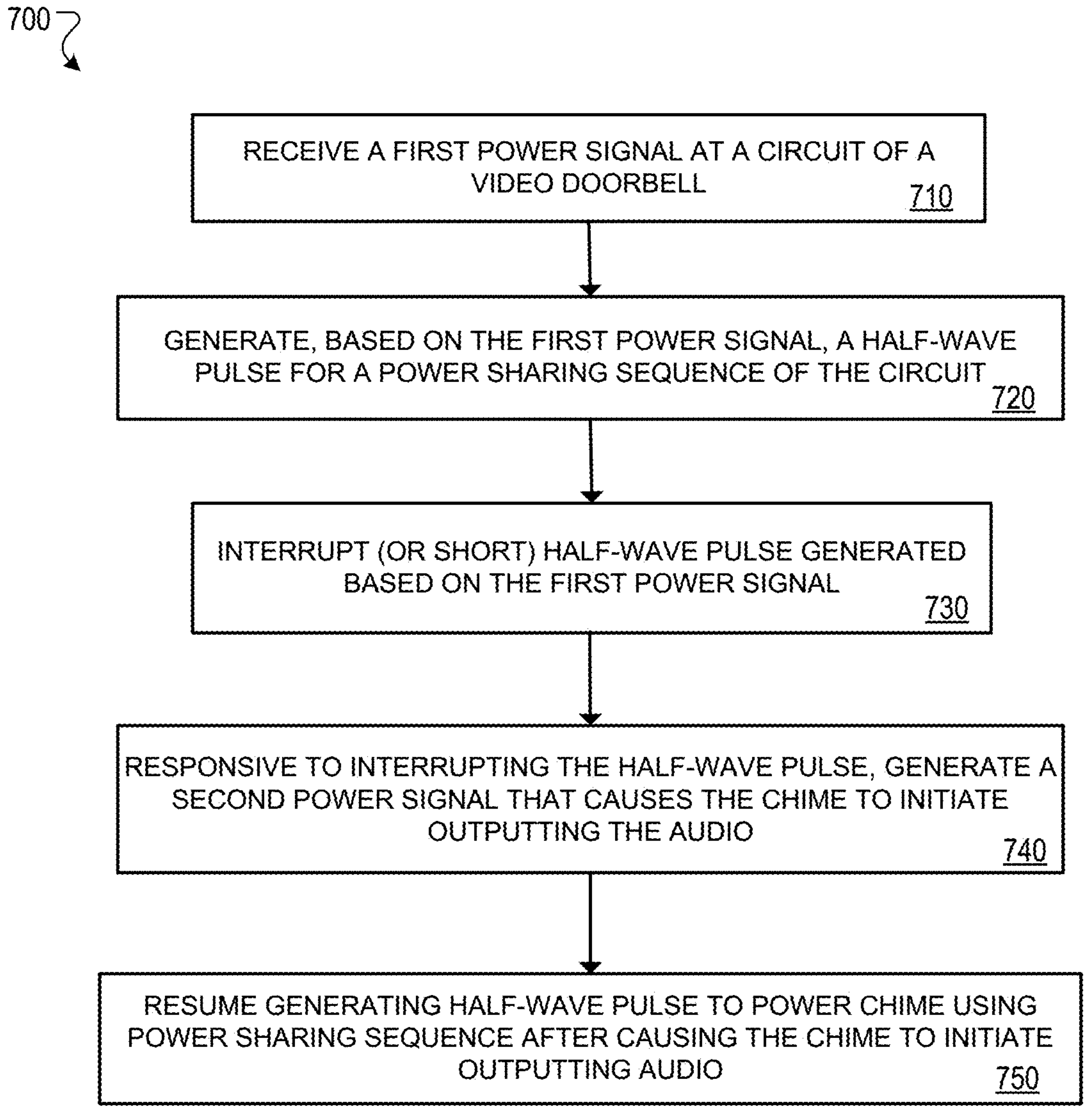
FIG. 7 illustrates an example process for executing the power sequencing technique.

FIG. 7 illustrates an example process 700 for executing the power sequencing technique. Process 700 is implemented or executed using at least the electronic chime 208, the circuit 600, and other associated hardware circuitry of the video doorbell 202. For example, process 700 can be implemented using a special-purpose circuit for powering an electronic chime that outputs audio in response to a trigger event detected by video doorbell 202. Hence, descriptions of process 700 will reference the computing resources described herein. In some examples, the steps or actions of process 700 are enabled by programmed software instructions, firmware instructions, or both. Each type of instruction may be stored in a non-transitory machine-readable storage device and is executable by one or more of the processors or other resources described in this specification.

Referring again to process 700, a first power signal is received at the circuit (710). The first power signal can be an AC power signal received from a source such as transformer 208. A half-wave pulse for a power sharing sequence of the circuit is generated based on the first power signal (720). The half-wave pulse can be generated for a predetermined, threshold time period. For example, the threshold time period can be approximately 0.5 seconds to 1.5 seconds. The half-wave pulse that was generated based on the first power signal is interrupted using control logic of the circuit 600 (730). For example, as described above with reference to FIG. 5, the second timing block 520 includes an indication of shorting or interrupting the ring power signal 522 for a predetermined, threshold time period. In some implementations, the first power signal is interrupted based on an interrupt control signal of a control logic of a microcontroller of circuit 600 or system 100.

A second power signal is generated in response to interrupting the half-wave pulse (740). The second power signal is generated for a first predetermined, threshold time period. In some implementations, the first predetermined, threshold time period is approximately ¾ of one second. In some other implementations, the first predetermined, threshold time period is a value selected from a range between ½ of one second to one second.

The second power signal corresponds to the first power signal and causes the electronic chime to initiate outputting the audio. For example, the second power signal can include a signal waveform that corresponds to, or is consistent with, a signal waveform of the first power signal. In some implementations, the first power signal and the first second power signal are full wave sinusoidal or square alternating current ("A/C") power signals.

In some implementations, the video doorbell is configured to generate a third power signal concurrent with generating the second power signal. For example, the third power signal is generated in response to interrupting the half-wave pulse. The system 100 can provide power to the video doorbell 202 using the third power signal concurrent with causing the chime to initiate outputting the audio using the second power signal. For example, the video doorbell 202 can generate a power signal concurrent with generating the ring power signal and in response to interrupting the half-wave pulse 512. This power signal (e.g., third power signal) can be a capacitor-based power signal generated using one or more super capacitors installed at a circuit integrated in the video doorbell 202. Thus, the system 100 or video doorbell

202 can generate the third power signal (or other power signals) from at least one super capacitor installed at the circuit.

After causing the electronic chime to initiate outputting the audio using the second power signal, process 700 resumes generating the half-wave pulse to power the electronic chime using the power sharing sequence (750). For example, the video doorbell of system 100 can generate the example half-wave pulse 514 for the power sharing sequence to power the electronic chime and to enable batteryless operation of the video doorbell 202, the electronic chime 208, or both.

Figure 8:
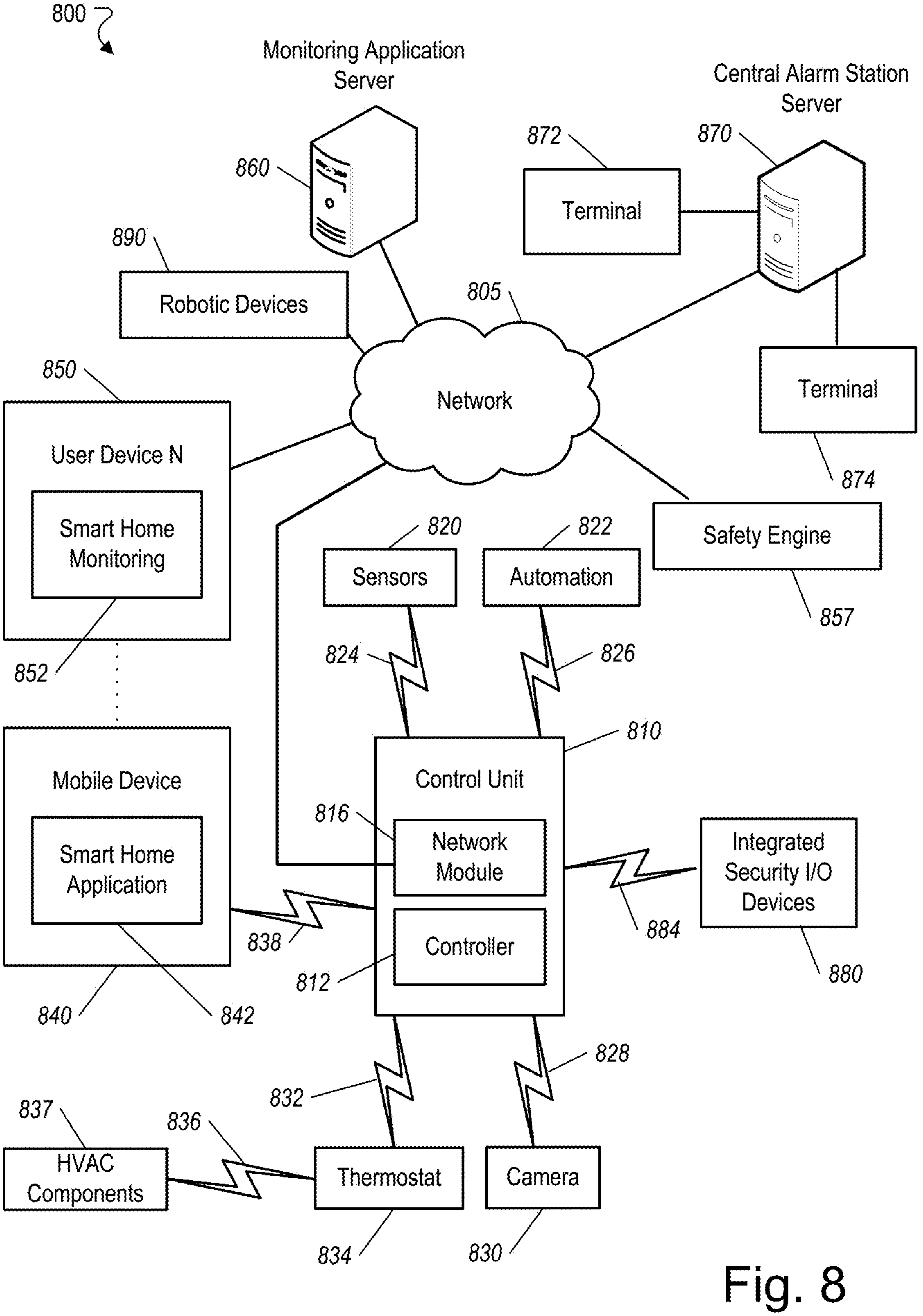
FIG. 8 is a block diagram illustrating an example security monitoring system.

FIG. 8 is a diagram illustrating an example of a home monitoring system 800. The monitoring system 800 includes a network 805, a control unit 810, one or more user devices 840 and 850, a monitoring server 860, and a central alarm station server 870. In some examples, the network 805 facilitates communications between the control unit 810, the one or more user devices 840 and 850, the monitoring server 860, and the central alarm station server 870.

The network 805 is configured to enable exchange of electronic communications between devices connected to the network 805. For example, the network 805 may be configured to enable exchange of electronic communications between the control unit 810, the one or more user devices 840 and 850, the monitoring server 860, and the central alarm station server 870. The network 805 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 805 may include multiple networks or subnetworks, each of which may include, for example, a wired or wireless data pathway. The network 805 may include a circuit-switched network, a packet-switched data network, or any other network able to carry electronic communications (e.g., data or voice communications). For example, the network 805 may include networks based on the Internet protocol (IP), asynchronous transfer mode (ATM), the PSTN, packet-switched networks based on IP, x.25, or Frame Relay, or other comparable technologies and may support voice using, for example, VoIP, or other comparable protocols used for voice communications. The network 805 may include one or more networks that include wireless data channels and wireless voice channels. The network 805 may be a wireless network, a broadband network, or a combination of networks including a wireless network and a broadband network.

The control unit 810 includes a controller 812 and a network module 816. The controller 812 is configured to control a control unit monitoring system (e.g., a control unit system) that includes the control unit 810. In some examples, the controller 812 may include a processor or other control circuitry configured to execute instructions of a program that controls operation of a control unit system. In these examples, the controller 812 may be configured to receive input from sensors, flow meters, or other devices included in the control unit system and control operations of devices included in the household (e.g., speakers, lights, doors, etc.). For example, the controller 812 may be configured to control operation of the network module 816 included in the control unit 810.

The network module 816 is a communication device configured to exchange communications over the network 805. The network module 816 may be a wireless communication module configured to exchange wireless communications over the network 805. For example, the network module 816 may be a wireless communication device configured to exchange communications over a wireless data channel and a wireless voice channel. In this example, the network module 816 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, 5G CDMA, EDGE or EGPRS, EV-DO or EVDO, UMTS, or IP.

The network module 816 also may be a wired communication module configured to exchange communications over the network 805 using a wired connection. For instance, the network module 816 may be a modem, a network interface card, or another type of network interface device. The network module 816 may be an Ethernet network card configured to enable the control unit 810 to communicate over a local area network and/or the Internet. The network module 816 also may be a voice band modem configured to enable the alarm panel to communicate over the telephone lines of Plain Old Telephone Systems (POTS).

The control unit system that includes the control unit 810 includes one or more sensors. For example, the monitoring system may include multiple sensors 820. The sensors 820 may include a lock sensor, a contact sensor, a motion sensor, or any other type of sensor included in a control unit system. The sensors 820 also may include an environmental sensor, such as a temperature sensor, a water sensor, a rain sensor, a wind sensor, a light sensor, a smoke detector, a carbon monoxide detector, an air quality sensor, etc. The sensors 820 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 820 can also include a radio-frequency identification (RFID) sensor that identifies a particular article that includes a pre-assigned RFID tag.

The control unit 810 communicates with the home automation controls 822 and a camera 830 to perform monitoring. The home automation controls 822 are connected to one or more devices that enable automation of actions in the home. For instance, the home automation controls 822 may be connected to one or more lighting systems and may be configured to control operation of the one or more lighting systems. In addition, the home automation controls 822 may be connected to one or more electronic locks at the home and may be configured to control operation of the one or more electronic locks (e.g., control Z-Wave locks using wireless communications in the Z-Wave protocol). Further, the home automation controls 822 may be connected to one or more appliances at the home and may be configured to control operation of the one or more appliances. The home automation controls 822 may include multiple modules that are each specific to the type of device being controlled in an automated manner. The home automation controls 822 may control the one or more devices based on commands received from the control unit 810. For instance, the home automation controls 822 may cause a lighting system to illuminate an area to provide a better image of the area when captured by a camera 830.

The camera 830 may be a video/photographic camera or other type of optical sensing device configured to capture images. For instance, the camera 830 may be configured to capture images of an area within a building or home monitored by the control unit 810. The camera 830 may be configured to capture single, static images of the area and also video images of the area in which multiple images of the area are captured at a relatively high frequency (e.g., thirty images per second). The camera 830 may be controlled based on commands received from the control unit 810.

The camera 830 may be triggered by several different types of techniques. For instance, a Passive Infra-Red (PIR) motion sensor may be built into the camera 830 and used to trigger the camera 830 to capture one or more images when motion is detected. The camera 830 also may include a microwave motion sensor built into the camera and used to trigger the camera 830 to capture one or more images when motion is detected. The camera 830 may have a “normally open” or “normally closed” digital input that can trigger capture of one or more images when external sensors (e.g., the sensors 820, PIR, door/window, etc.) detect motion or other events. In some implementations, the camera 830 receives a command to capture an image when external devices detect motion or another potential alarm event. The camera 830 may receive the command from the controller 812 or directly from one of the sensors 820.

In some examples, the camera 830 triggers integrated or external illuminators (e.g., Infra-Red, Z-wave controlled “white” lights, lights controlled by the home automation controls 822, etc.) to improve image quality when the scene is dark. An integrated or separate light sensor may be used to determine if illumination is desired and may result in increased image quality.

The camera 830 may be programmed with any combination of time/day schedules, system “arming state”, or other variables to determine whether images should be captured or not when triggers occur. The camera 830 may enter a low-power mode when not capturing images. In this case, the camera 830 may wake periodically to check for inbound messages from the controller 812. The camera 830 may be powered by internal, replaceable batteries if located remotely from the control unit 810. The camera 830 may employ a small solar cell to recharge the battery when light is available. Alternatively, the camera 830 may be powered by the controller’s 812 power supply if the camera 830 is co-located with the controller 812.

In some implementations, the camera 830 communicates directly with the monitoring server 860 over the Internet. In these implementations, image data captured by the camera 830 does not pass through the control unit 810 and the camera 830 receives commands related to operation from the monitoring server 860.

The system 800 may also include a thermostat 834 to perform dynamic environmental control at the home. The thermostat 834 is configured to monitor temperature and/or energy consumption of an HVAC system associated with the thermostat 834, and is further configured to provide control of environmental (e.g., temperature) settings. In some implementations, the thermostat 834 can additionally or alternatively receive data relating to activity at a home and/or environmental data at a home, e.g., at various locations indoors and outdoors at the home. The thermostat 834 can directly measure energy consumption of the HVAC system associated with the thermostat, or can estimate energy consumption of the HVAC system associated with the thermostat 834, for example, based on detected usage of one or more components of the HVAC system associated with the thermostat 834. The thermostat 834 can communicate temperature and/or energy monitoring information to or from the control unit 810 and can control the environmental (e.g., temperature) settings based on commands received from the control unit 810.

In some implementations, the thermostat 834 is a dynamically programmable thermostat and can be integrated with the control unit 810. For example, the dynamically programmable thermostat 834 can include the control unit 810, e.g., as an internal component to the dynamically programmable thermostat 834. In addition, the control unit 810 can be a gateway device that communicates with the dynamically programmable thermostat 834. In some implementations, the thermostat 834 is controlled via one or more home automation controls 822.

A module 837 is connected to one or more components of an HVAC system associated with a home, and is configured to control operation of the one or more components of the HVAC system. In some implementations, the module 837 is also configured to monitor energy consumption of the HVAC system components, for example, by directly measuring the energy consumption of the HVAC system components or by estimating the energy usage of the one or more HVAC system components based on detecting usage of components of the HVAC system. The module 837 can communicate energy monitoring information and the state of the HVAC system components to the thermostat 834 and can control the one or more components of the HVAC system based on commands received from the thermostat 834.

In some examples, the system 800 further includes one or more robotic devices 890. The robotic devices 890 may be any type of robots that are capable of moving and taking actions that assist in home monitoring. For example, the robotic devices 890 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 890 may be devices that are intended for other purposes and merely associated with the system 800 for use in appropriate circumstances. For instance, a robotic vacuum cleaner device may be associated with the monitoring system 800 as one of the robotic devices 890 and may be controlled to take action responsive to monitoring system events.

In some examples, the robotic devices 890 automatically navigate within a home or outside a home. In these examples, the robotic devices 890 include sensors and control processors that guide movement of the robotic devices 890 within the home or outside the home. For instance, the robotic devices 890 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 890 may include control processors that process output from the various sensors and control the robotic devices 890 to move along a path that reaches the desired destination and avoids obstacles. In this regard, the control processors detect walls or other obstacles in the home or outside the home and guide movement of the robotic devices 890 in a manner that avoids the walls, trees, fences, and other obstacles.

In addition, the robotic devices 890 may store data that describes attributes of the home and the area outside the home. For instance, the robotic devices 890 may store a floorplan, a property map, and/or a three-dimensional model of the home that enables the robotic devices 890 to navigate the home. During initial configuration, the robotic devices 890 may receive the data describing attributes of the home, determine a frame of reference to the data (e.g., a home or reference location in the home), and navigate the home based on the frame of reference and the data describing attributes of the home. Further, initial configuration of the robotic devices 890 also may include learning of one or more navigation patterns in which a user provides input to control the robotic devices 890 to perform a specific navigation action (e.g., fly to an upstairs bedroom and spin around while capturing video and then return to a home charging base). In this regard, the robotic devices 890 may learn and store the navigation patterns such that the robotic devices 890 may automatically repeat the specific navigation actions upon a later request.

In some examples, the robotic devices 890 may include data capture and recording devices. In these examples, the robotic devices 890 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 890 to take and store a biometric sample that can be used to identify the person (e.g., a biometric sample with DNA that can be used for DNA testing).

In some implementations, the robotic devices 890 may include output devices. In these implementations, the robotic devices 890 may include one or more displays, one or more speakers, and/or any type of output devices that allow the robotic devices 890 to communicate information to a nearby user.

The robotic devices 890 also may include a communication module that enables the robotic devices 890 to communicate with the control unit 810, each other, and/or other devices. The communication module may be a wireless communication module that allows the robotic devices 890 to communicate wirelessly. For instance, the communication module may be a Wi-Fi module that enables the robotic devices 890 to communicate over a local wireless network at the home. The communication module further may be a 900 MHz wireless communication module that enables the robotic devices 890 to communicate directly with the control unit 810. Other types of short-range wireless communication protocols, such as Bluetooth, Bluetooth LE, Z-wave, Zigbee, etc., may be used to allow the robotic devices 890 to communicate with other devices in the home. In some implementations, the robotic devices 890 may communicate with each other or with other devices of the system 800 through the network 805.

The robotic devices 890 further may include processor and storage capabilities. The robotic devices 890 may include any suitable processing devices that enable the robotic devices 890 to operate applications and perform the actions described throughout this disclosure. In addition, the robotic devices 890 may include solid-state electronic storage that enables the robotic devices 890 to store applications, configuration data, collected sensor data, and/or any other type of information available to the robotic devices 890.

The robotic devices 890 are associated with one or more charging stations. The charging stations may be located at predefined home base or reference locations in the home. The robotic devices 890 may be configured to navigate to the charging stations after completion of tasks needed to be performed for the monitoring system 800. For instance, after completion of a monitoring operation or upon instruction by the control unit 810, the robotic devices 890 may be configured to automatically fly to and land on one of the charging stations. In this regard, the robotic devices 890 may automatically maintain a fully charged battery in a state in which the robotic devices 890 are ready for use by the monitoring system 800.

The charging stations may be contact based charging stations and/or wireless charging stations. For contact based charging stations, the robotic devices 890 may have readily accessible points of contact that the robotic devices 890 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 890 may charge through a wireless exchange of power. In these cases, the robotic devices 890 need only locate themselves closely enough to the wireless charging stations for the wireless exchange of power to occur. In this regard, the positioning needed to land at a predefined home base or reference location in the home may be less precise than with a contact based charging station. Based on the robotic devices 890 landing at a wireless charging station, the wireless charging station outputs a wireless signal that the robotic devices 890 receive and convert to a power signal that charges a battery maintained on the robotic devices 890.

In some implementations, each of the robotic devices 890 has a corresponding and assigned charging station such that the number of robotic devices 890 equals the number of charging stations. In these implementations, the robotic devices 890 always navigate to the specific charging station assigned to that robotic device. For instance, a first robotic device may always use a first charging station and a second robotic device may always use a second charging station.

In some examples, the robotic devices 890 may share charging stations. For instance, the robotic devices 890 may use one or more community charging stations that are capable of charging multiple robotic devices 890. The community charging station may be configured to charge multiple robotic devices 890 in parallel. The community charging station may be configured to charge multiple robotic devices 890 in serial such that the multiple robotic devices 890 take turns charging and, when fully charged, return to a predefined home base or reference location in the home that is not associated with a charger. The number of community charging stations may be less than the number of robotic devices 890.

In addition, the charging stations may not be assigned to specific robotic devices 890 and may be capable of charging any of the robotic devices 890. In this regard, the robotic devices 890 may use any suitable, unoccupied charging station when not in use. For instance, when one of the robotic devices 890 has completed an operation or is in need of battery charge, the control unit 810 references a stored table of the occupancy status of each charging station and instructs the robotic device to navigate to the nearest charging station that is unoccupied.

The system 800 further includes one or more integrated security devices 880. The one or more integrated security devices may include any type of device used to provide alerts based on received sensor data. For instance, the one or more control units 810 may provide one or more alerts to the one or more integrated security input/output devices 880. Additionally, the one or more control units 810 may receive one or more sensor data from the sensors 820 and determine whether to provide an alert to the one or more integrated security input/output devices 880.

The sensors 820, the home automation controls 822, the camera 830, the thermostat 834, and the integrated security devices 880 may communicate with the controller 812 over communication links 824, 826, 828, 832, 838, and 884. The communication links 824, 826, 828, 832, 838, and 884 may be a wired or wireless data pathway configured to transmit signals from the sensors 820, the home automation controls 822, the camera 830, the thermostat 834, and the integrated security devices 880 to the controller 812. The sensors 820, the home automation controls 822, the camera 830, the thermostat 834, and the integrated security devices 880 may continuously transmit sensed values to the controller 812, periodically transmit sensed values to the controller 812, or transmit sensed values to the controller 812 in response to a change in a sensed value.

The communication links 824, 826, 828, 832, 838, and 884 may include a local network. The sensors 820, the home automation controls 822, the camera 830, the thermostat 834, and the integrated security devices 880, and the controller 812 may exchange data and commands over the local network. The local network may include 802.11 “Wi-Fi” wireless Ethernet (e.g., using low-power Wi-Fi chipsets), Z-Wave, Zigbee, Bluetooth, “Homeplug” or other “Powerline” networks that operate over AC wiring, and a Category 8 (CAT5) or Category 6 (CAT6) wired Ethernet network. The local network may be a mesh network constructed based on the devices connected to the mesh network.

The monitoring server 860 is an electronic device configured to provide monitoring services by exchanging electronic communications with the control unit 810, the one or more user devices 840 and 850, and the central alarm station server 870 over the network 805. For example, the monitoring server 860 may be configured to monitor events generated by the control unit 810. In this example, the monitoring server 860 may exchange electronic communications with the network module 816 included in the control unit 810 to receive information regarding events detected by the control unit 810. The monitoring server 860 also may receive information regarding events from the one or more user devices 840 and 850.

In some examples, the monitoring server 860 may route alert data received from the network module 816 or the one or more user devices 840 and 850 to the central alarm station server 870. For example, the monitoring server 860 may transmit the alert data to the central alarm station server 870 over the network 805.

The monitoring server 860 may store sensor and image data received from the monitoring system and perform analysis of sensor and image data received from the monitoring system. Based on the analysis, the monitoring server 860 may communicate with and control aspects of the control unit 810 or the one or more user devices 840 and 850.

The monitoring server 860 may provide various monitoring services to the system 800. For example, the monitoring server 860 may analyze the sensor, image, and other data to determine an activity pattern of a resident of the home monitored by the system 800. In some implementations, the monitoring server 860 may analyze the data for alarm conditions or may determine and perform actions at the home by issuing commands to one or more of the controls 822, possibly through the control unit 810.

The monitoring server 860 can be configured to provide information (e.g., activity patterns) related to one or more residents of the home monitored by the system 800 (e.g., an example user). For example, one or more of the sensors 820, the home automation controls 822, the camera 830, the thermostat 834, and the integrated security devices 880 can collect data related to a resident including location information (e.g., if the resident is home or is not home) and provide location information to the thermostat 834.

The central alarm station server 870 is an electronic device configured to provide alarm monitoring service by exchanging communications with the control unit 810, the one or more user devices 840 and 850, and the monitoring server 860 over the network 805. For example, the central alarm station server 870 may be configured to monitor alerting events generated by the control unit 810. In this example, the central alarm station server 870 may exchange communications with the network module 816 included in the control unit 810 to receive information regarding alerting events detected by the control unit 810. The central alarm station server 870 also may receive information regarding alerting events from the one or more user devices 840 and 850 and/or the monitoring server 860.

The central alarm station server 870 is connected to multiple terminals 872 and 874. The terminals 872 and 874 may be used by operators to process alerting events. For example, the central alarm station server 870 may route alerting data to the terminals 872 and 874 to enable an operator to process the alerting data. The terminals 872 and 874 may include general-purpose computers (e.g., desktop personal computers, workstations, or laptop computers) that are configured to receive alerting data from a server in the central alarm station server 870 and render a display of information based on the alerting data. For instance, the controller 812 may control the network module 816 to transmit, to the central alarm station server 870, alerting data indicating that a sensor 820 detected motion from a motion sensor via the sensors 820. The central alarm station server 870 may receive the alerting data and route the alerting data to the terminal 872 for processing by an operator associated with the terminal 872. The terminal 872 may render a display to the operator that includes information associated with the alerting event (e.g., the lock sensor data, the motion sensor data, the contact sensor data, etc.) and the operator may handle the alerting event based on the displayed information.

In some implementations, the terminals 872 and 874 may be mobile devices or devices designed for a specific function. Although FIG. 8 illustrates two terminals for brevity, actual implementations may include more (and, perhaps, many more) terminals.

The one or more authorized user devices 840 and 850 are devices that host and display user interfaces. For instance, the user device 840 is a mobile device that hosts or runs one or more native applications (e.g., the home monitoring application 842). The user device 840 may be a cellular phone or a non-cellular locally networked device with a display. The user device 840 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 840 may perform functions unrelated to the monitoring system, such as placing personal telephone calls, playing music, playing video, displaying pictures, browsing the Internet, maintaining an electronic calendar, etc.

The user device 840 includes a home monitoring application 852. The home monitoring application 842 refers to a software/firmware program running on the corresponding mobile device that enables the user interface and features described throughout. The user device 840 may load or install the home monitoring application 842 based on data received over a network or data received from local media. The home monitoring application 842 runs on mobile devices platforms, such as iPhone, iPod touch, Blackberry, Google Android, Windows Mobile, etc. The home monitoring application 842 enables the user device 840 to receive and process image and sensor data from the monitoring system.

The user device 840 may be a general-purpose computer (e.g., a desktop personal computer, a workstation, or a laptop computer) that is configured to communicate with the monitoring server 860 and/or the control unit 810 over the network 805. The user device 840 may be configured to display a smart home user interface 852 that is generated by the user device 840 or generated by the monitoring server 860. For example, the user device 840 may be configured to display a user interface (e.g., a web page) provided by the monitoring server 860 that enables a user to perceive images captured by the camera 830 and/or reports related to the monitoring system. Although FIG. 8 illustrates two user devices for brevity, actual implementations may include more (and, perhaps, many more) or fewer user devices.

In some implementations, the one or more user devices 840 and 850 communicate with and receive monitoring system data from the control unit 810 using the communication link 838. For instance, the one or more user devices 840 and 850 may communicate with the control unit 810 using various local wireless protocols such as Wi-Fi, Bluetooth, Z-wave, Zigbee, MoCA, HomePlug (ethernet over power line), or wired protocols such as Ethernet and USB, to connect the one or more user devices 840 and 850 to local security and automation equipment. The one or more user devices 840 and 850 may connect locally to the monitoring system and its sensors and other devices. The local connection may improve the speed of status and control communications because communicating through the network 805 with a remote server (e.g., the monitoring server 860) may be significantly slower.

Although the one or more user devices 840 and 850 are shown as communicating with the control unit 810, the one or more user devices 840 and 850 may communicate directly with the sensors and other devices controlled by the control unit 810. In some implementations, the one or more user devices 840 and 850 replace the control unit 810 and perform the functions of the control unit 810 for local monitoring and long range/offsite communication.

In other implementations, the one or more user devices 840 and 850 receive monitoring system data captured by the control unit 810 through the network 805. The one or more user devices 840, 850 may receive the data from the control unit 810 through the network 805 or the monitoring server 860 may relay data received from the control unit 810 to the one or more user devices 840 and 850 through the network 805. In this regard, the monitoring server 860 may facilitate communication between the one or more user devices 840 and 850 and the monitoring system.

In some implementations, the one or more user devices 840 and 850 may be configured to switch whether the one or more user devices 840 and 850 communicate with the control unit 810 directly (e.g., through link 838) or through the monitoring server 860 (e.g., through network 805) based on a location of the one or more user devices 840 and 850. For instance, when the one or more user devices 840 and 850 are located close to the control unit 810 and in range to communicate directly with the control unit 810, the one or more user devices 840 and 850 use direct communication. When the one or more user devices 840 and 850 are located far from the control unit 810 and not in range to communicate directly with the control unit 810, the one or more user devices 840 and 850 use communication through the monitoring server 860.

Although the one or more user devices 840 and 850 are shown as being connected to the network 805, in some implementations, the one or more user devices 840 and 850 are not connected to the network 805. In these implementations, the one or more user devices 840 and 850 communicate directly with one or more of the monitoring system components and no network (e.g., Internet) connection or reliance on remote servers is needed.

In some implementations, the one or more user devices 840 and 850 are used in conjunction with only local sensors and/or local devices in a house. In these implementations, the system 800 includes the one or more user devices 840 and 850, the sensors 820, the home automation controls 822, the camera 830, and the robotic devices 890. The one or more user devices 840 and 850 receive data directly from the sensors 820, the home automation controls 822, the camera 830, and the robotic devices 890, and sends data directly to the sensors 820, the home automation controls 822, the camera 830, and the robotic devices 890. The one or more user devices 840, 850 provide the appropriate interfaces/processing to provide visual surveillance and reporting.

In other implementations, the system 800 further includes network 805 and the sensors 820, the home automation controls 822, the camera 830, the thermostat 834, and the robotic devices 890, and are configured to communicate sensor and image data to the one or more user devices 840 and 850 over network 805 (e.g., the Internet, cellular network, etc.). In yet another implementation, the sensors 820, the home automation controls 822, the camera 830, the thermostat 834, and the robotic devices 890 (or a component, such as a bridge/router) are intelligent enough to change the communication pathway from a direct local pathway when the one or more user devices 840 and 850 are in close physical proximity to the sensors 820, the home automation controls 822, the camera 830, the thermostat 834, and the robotic devices 890 to a pathway over network 805 when the one or more user devices 840 and 850 are farther from the sensors 820, the home automation controls 822, the camera 830, the thermostat 834, and the robotic devices 890.

In some examples, the system leverages GPS information from the one or more user devices 840 and 850 to determine whether the one or more user devices 840 and 850 are close enough to the sensors 820, the home automation controls 822, the camera 830, the thermostat 834, and the robotic devices 890 to use the direct local pathway or whether the one or more user devices 840 and 850 are far enough from the sensors 820, the home automation controls 822, the camera 830, the thermostat 834, and the robotic devices 890 that the pathway over network 805 is required.

In other examples, the system leverages status communications (e.g., pinging) between the one or more user devices 840 and 850 and the sensors 820, the home automation controls 822, the camera 830, the thermostat 834, and the robotic devices 890 to determine whether communication using the direct local pathway is possible. If communication using the direct local pathway is possible, the one or more user devices 840 and 850 communicate with the sensors 820, the home automation controls 822, the camera 830, the thermostat 834, and the robotic devices 890 using the direct local pathway. If communication using the direct local pathway is not possible, the one or more user devices 840 and 850 communicate with the sensors 820, the home automation controls 822, the camera 830, the thermostat 834, and the robotic devices 890 using the pathway over network 805.

In some implementations, the system 800 provides end users with access to images captured by the camera 830 to aid in decision making. The system 800 may transmit the images captured by the camera 830 over a wireless WAN network to the user devices 840 and 850. Because transmission over a wireless WAN network may be relatively expensive, the system 800 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 830). In these implementations, the camera 830 may be set to capture images on a periodic basis when the alarm system is armed in an "away" state, but set not to capture images when the alarm system is armed in a "home" state or disarmed. In addition, the camera 830 may be triggered to begin capturing images when the alarm system detects an event, such as an alarm event, a door-opening event for a door that leads to an area within a field of view of the camera 830, or motion in the area within the field of view of the camera 830. In other implementations, the camera 830 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method implemented using a circuit for powering a chime that outputs audio in response to a trigger event, the method comprising:

receiving, from a source, a first power signal at the circuit;

generating, based on the first power signal, a half-wave pulse for a power sharing sequence of the circuit; and in response to receiving data indicating the trigger event occurred:

interrupting the half-wave pulse that was generated based on the first power signal and was for the power sharing sequence of the circuit;

generating a second power signal that causes the chime to initiate outputting the audio, wherein the second power signal corresponds to the first power signal and is generated in response to interrupting the half-wave pulse;

replacing the interrupted half-wave pulse with the second power signal; and resuming generating the half-wave pulse to power the chime using the power sharing sequence after causing the chime to initiate outputting the audio using the second power signal.

2. The method of claim 1, wherein:

the chime is in signal communication with a video doorbell; and the trigger event coincides with: i) detection, by the video doorbell, of an individual at a property or ii) a button on the video doorbell being pressed.

3. The method of claim 2, wherein replacing the interrupted half-wave pulse with the second power signal comprises:

replacing the interrupted half-wave pulse for a first predetermined, threshold time period.

4. The method of claim 3, further comprising:

generating a third power signal concurrently with generating the second power signal in response to interrupting the half-wave pulse; and providing power to the video doorbell using the third power signal concurrent with causing the chime to initiate outputting the audio using the second power signal.

5. The method of claim 4, wherein generating the third power signal concurrent with generating the second power signal comprises:

generating the third power signal from at least one super capacitor installed at the circuit.

6. The method of claim 3, wherein the first predetermined, threshold time period is approximately 0.75 seconds.

7. The method of claim 3, wherein the first predetermined, threshold time period is a value selected from a range between 0.5 seconds to one second.

8. The method of claim 1, wherein the second power signal and the first power signal are full wave sinusoidal or square alternating current ("A/C") power signals.

9. The method of claim 1, wherein the second power signal comprises a signal waveform that corresponds to, or is consistent with, a signal waveform of the first power signal.

10. The method of claim 9, wherein generating the half-wave pulse based on the first power signal comprises:

generating the half-wave pulse for a second predetermined, threshold time period.

11. The method of claim 10, wherein the second predetermined, threshold time period is approximately 0.5 seconds to 1.5 seconds.

12. A system for powering a chime that outputs audio in response to a trigger event, the system comprising:

a circuit;

a processing device; and a non-transitory machine-readable storage device storing instructions that are executable by the processing device to cause performance of operations comprising:

receiving, from a source, a first power signal at the circuit;

generating, based on the first power signal, a half-wave pulse for a power sharing sequence of the circuit; and in response to receiving data indicating the trigger event occurred:

interrupting the half-wave pulse that was generated based on the first power signal and was for the power sharing sequence of the circuit;

generating a second power signal that causes the chime to initiate outputting the audio, wherein the second power signal corresponds to the first power signal and is generated in response to interrupting the half-wave pulse;

replacing the interrupted half-wave pulse with the second power signal; and resuming generating the half-wave pulse to power the chime using the power sharing sequence after causing the chime to initiate outputting the audio using the second power signal.

13. The system of claim 12, wherein:

the chime is in signal communication with a video doorbell; and the trigger event coincides with: i) a button on the video doorbell being pressed, or ii) detection, by the video doorbell, of an event at a property, the event comprising a person, a car, an animal, or an object in motion.

14. The system of claim 13, wherein replacing the interrupted half-wave pulse with the second power comprises:

replacing the interrupted half-wave pulse for a first predetermined, threshold time period.

15. The system of claim 14, further comprising:

generating a third power signal concurrently with generating the second power signal in response to interrupting the half-wave pulse; and providing power to the video doorbell using the third power signal concurrent with causing the chime to initiate outputting the audio using the second power signal.

16. The system of claim 15, wherein generating the third power signal concurrent with generating the second power signal comprises:

generating the third power signal from at least one super capacitor installed at the circuit.

17. The system of claim 14, wherein the first predetermined, threshold time period is approximately 0.75 seconds.

18. The system of claim 14, wherein the first predetermined, threshold time period is a value selected from a range between 0.5 seconds to 1.5 seconds.

19. The system of claim 12, wherein the second power signal and the first power signal are alternating current ("A/C") power signals.

20. A non-transitory machine-readable storage device storing instructions for a method implemented using a circuit for powering a chime that outputs audio in response to a trigger event, the instructions being executable by a processing device to cause performance of operations comprising:

receiving, from a source, a first power signal at the circuit;

generating, based on the first power signal, a half-wave pulse for a power sharing sequence of the circuit; and in response to receiving data indicating the trigger event occurred:

interrupting the half-wave pulse that was generated based on the first power signal and was for the power sharing sequence of the circuit;

generating a second power signal that causes the chime to initiate outputting the audio, wherein the second power signal corresponds to the first power signal and is generated in response to interrupting the half-wave pulse;

replacing the interrupted half-wave pulse with the second power signal; and resuming generating the half-wave pulse to power the chime using the power sharing sequence after causing the chime to initiate outputting the audio using the second power signal.

* * * * *